W. V. TURNER.
RETARDED RELEASE TRIPLE VALVE DEVICE.
APPLICATION FILED SEPT. 14, 1908.
1,134,425.
Patented Apr. 6, 1915.
3 SHEETS—SHEET 1.
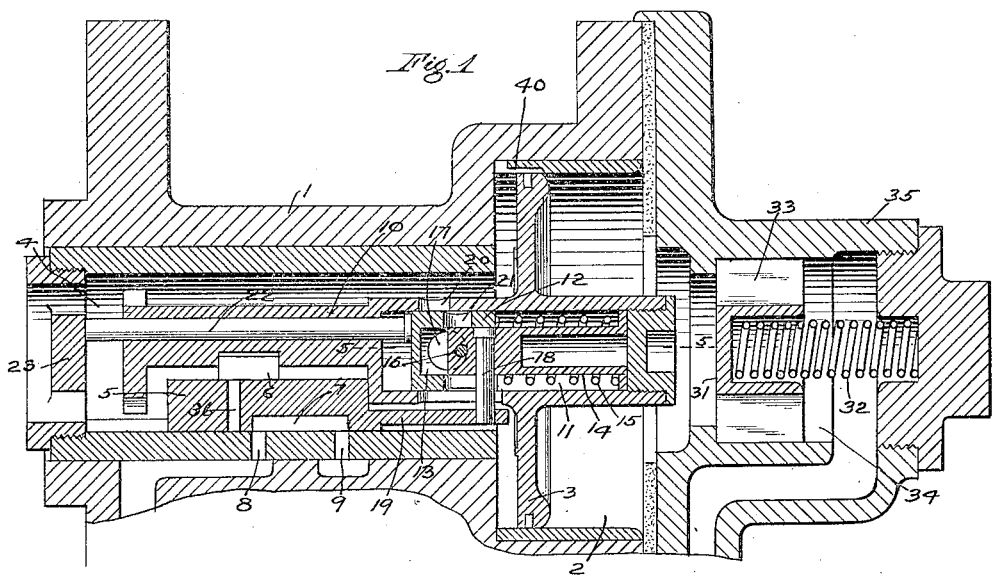
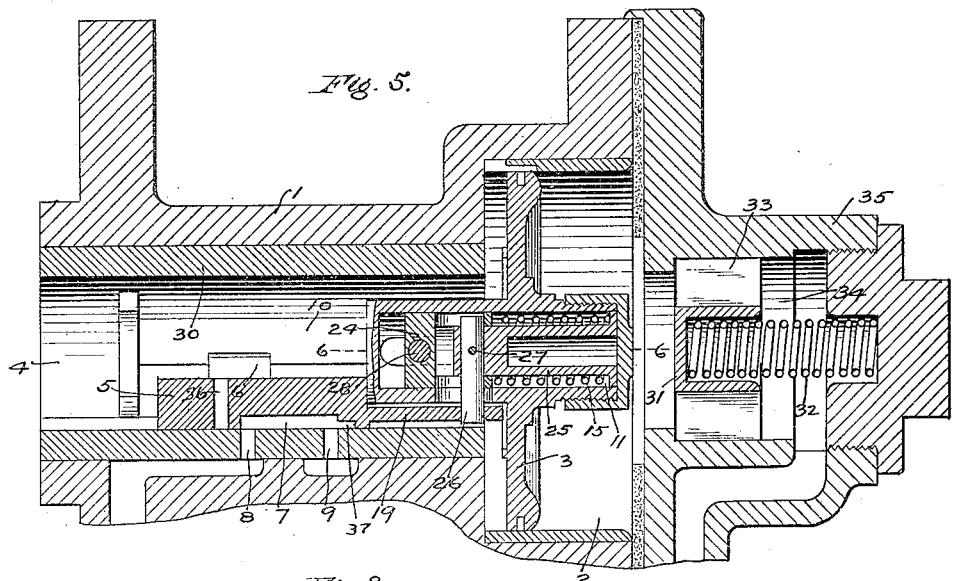
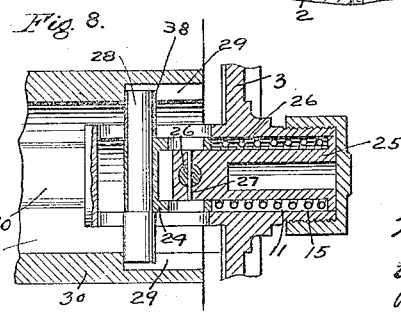
WITNESSES
Wm. M. Cady
J. S. Custer
INVENTOR
Walter V. Turner
by E. Wright
Att'y.

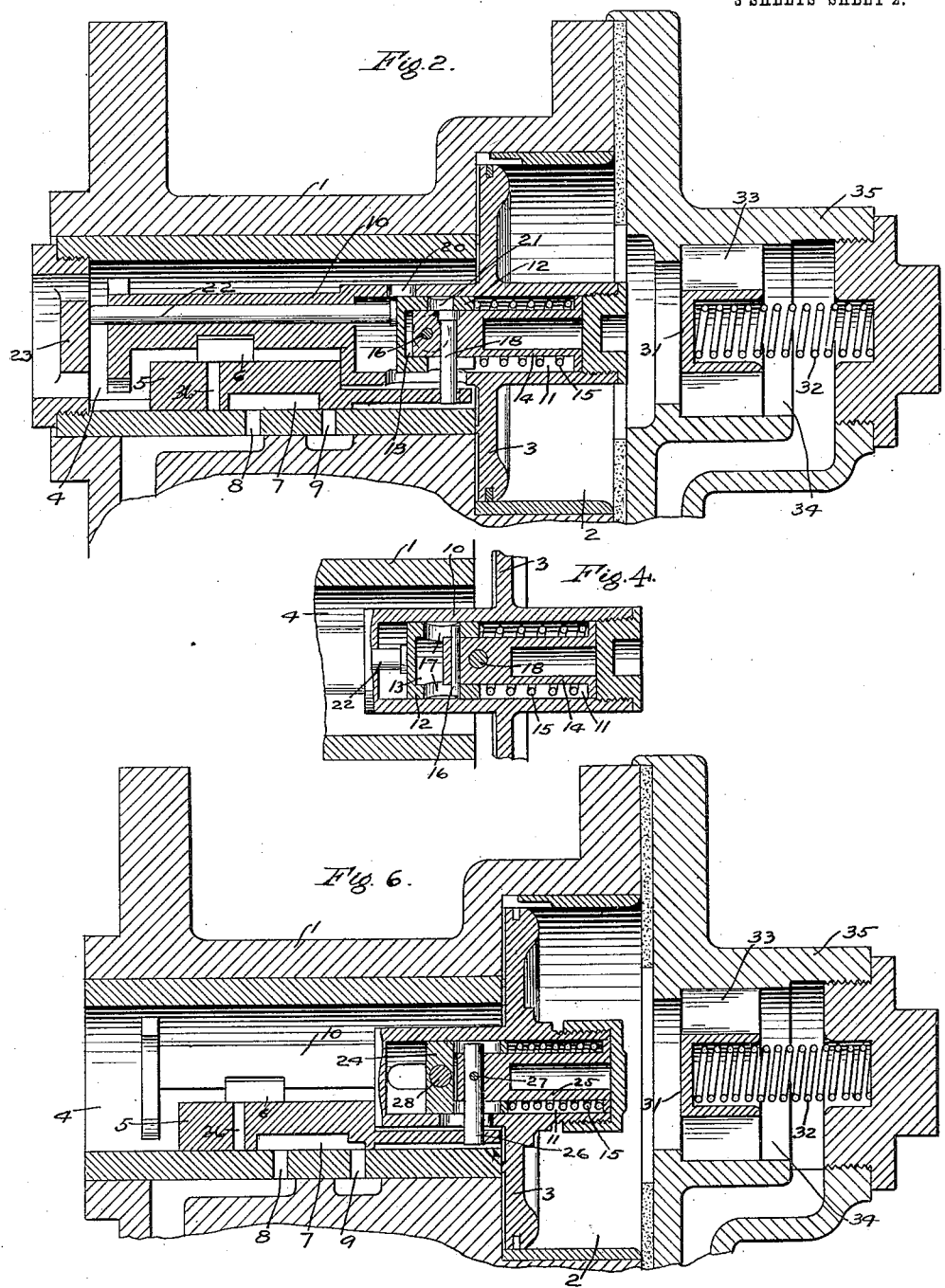

W. V. TURNER.
RETARDED RELEASE TRIPLE VALVE DEVICE.
APPLICATION FILED SEPT. 14, 1908.

1,134,425.

Patented Apr. 6, 1915.

3 SHEETS—SHEET 3.

WITNESSES
Wm. M. Cady
J. S. Custer

INVENTOR
Walter V. Turner
by E. W. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

RETARDED-RELEASE TRIPLE-VALVE DEVICE.

1,134,425.  Specification of Letters Patent.  Patented Apr. 6, 1915.

Application filed September 14, 1908. Serial No. 452,991.

*To all whom it may concern:*

Be it known that I, WALTER V. TURNER, a citizen of the United States, residing at Edgewood, in the county of Allegheny and State of Pensylvania, have invented new and useful Improvements in Retarded-Release Triple-Valve Devices, of which the following is a specification.

This invention relates to fluid pressure brakes, and more particularly to a triple valve device adapted to retard the release of the brakes at the head end of the train so as to secure a more uniform and simultaneous release of the brakes throughout the train and of that type comprising a main slide valve, the movement of which from normal full release position to an inner position restricts or cuts off the flow of air from the brake cylinder through the exhaust port, so as to retard the release of the brakes, an auxiliary or graduating valve having a movement relative to the main valve for controlling the supply of air to the brake cylinder in service applications of the brakes, and a yielding resistance device for opposing the inward movement of the valve parts from full release to the retarded release position.

One object of my invention is to provide a construction of the above character in which the yielding resistance device is carried by the moving parts of the triple valve device.

Another feature of my improvements consists in confining the resistance spring between fixed abutments so as to provide an initial compression in the spring whereby a more uniform and certain resistance is interposed to resist the movement of the parts from the full to the retarded release position.

Still another object of my invention is to provided an improved retarded release triple valve device which is compact and durable and which may be handled in shipping or otherwise without liability to damage.

Figure 3:
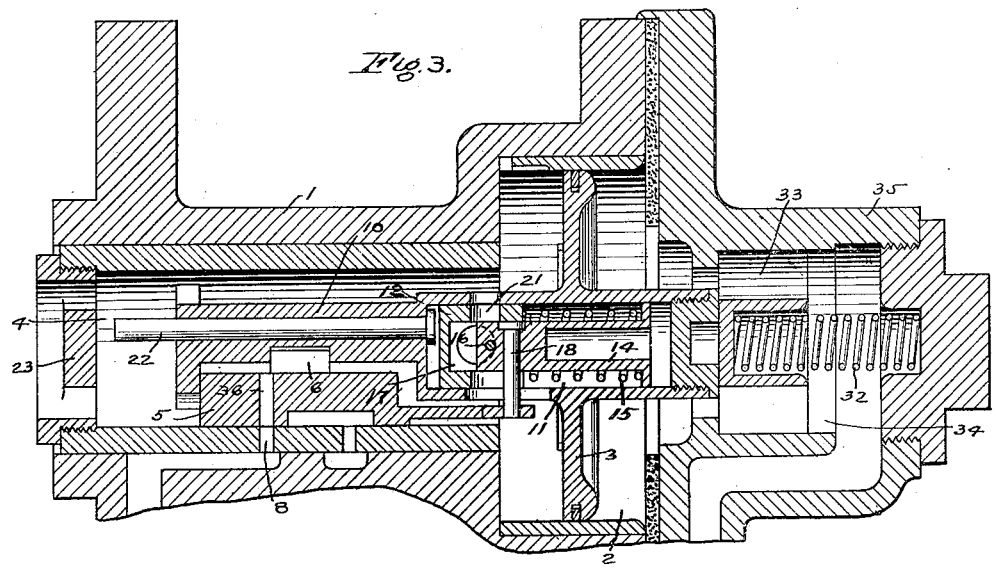
Figure 7:
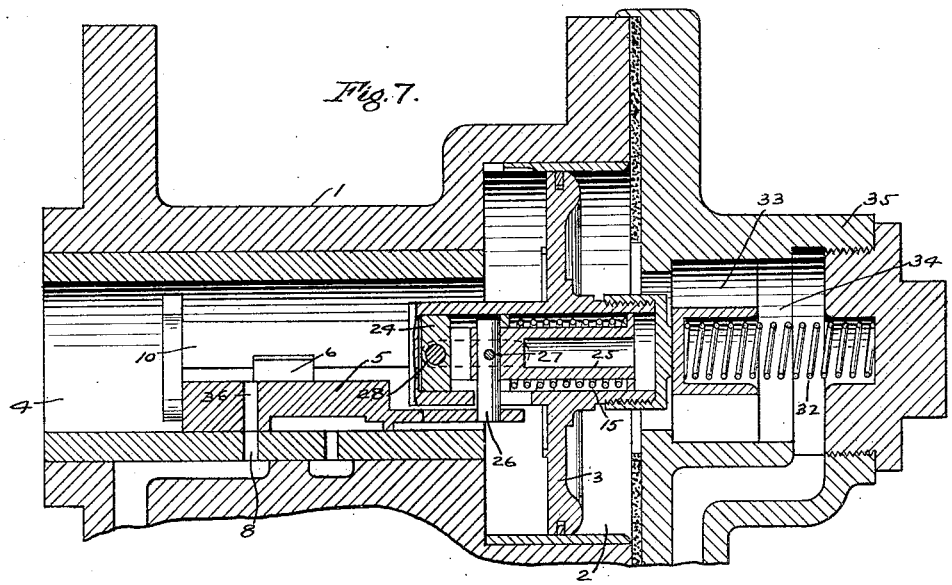

In the accompanying drawings; Figure 1 is a central sectional view of a triple valve device embodying one form of my improvements, showing the parts in full release position; Figs. 2 and 3 similar views but showing the parts respectively in retarded release and service application positions; Fig. 4 a fragmentary sectional view on line 5—5 of Fig. 1; Fig. 5 a central section of a triple valve device with another form of my invention applied thereto, showing the parts in full release position; Figs. 6 and 7 similar views, showing the parts respectively in retarded release and service application positions; and Fig. 8 a fragmentary section taken on the line 6—6 of Fig. 5.

According to the construction illustrated in Figs. 1, 2, 3, and 4 of the drawings, I provide a triple valve casing 1, having piston chamber 2 containing triple valve piston 3 and valve chamber 4 containing the main slide valve 5 and an auxiliary or graduating valve 6 mounted on and having a movement relative to said main valve. The main slide valve 5 is provided with cavity 7 for connecting the brake cylinder port 8 with exhaust port 9 in normal full release position and service port 36 controlled by the auxiliary valve 6 and adapted in service position to register with brake cylinder port 8, so as to supply air from the auxiliary reservoir to the brake cylinder in the usual manner.

In order to retard the release of the brakes the main slide valve 5 is adapted to be moved by the triple valve piston 3 to an inner retarded release position in which the flow of air from the brake cylinder through the exhaust port is restricted or entirely cut off and a yielding resistance means is provided for opposing or resisting the movement of the main valve and the triple piston to the retarded release position.

According to one form of my improvements, the yielding resistance device comprises a coil spring 15 mounted on a stem 14 having a flanged end against which one end of the spring bears. The other end of the spring engages the end portion of a thimble section 12 which fits over the end of the stem 14. The spring is thus confined between fixed abutments, and by forcing the thimble section 12 inwardly the spring 15 is compressed and may be held under such compression by inserting a pin 16 through a properly located hole in the stem 14, the thimble 12 being provided with apertures 17 against the end walls of which the pin 16 is adapted to bear and resist outward movement of the thimble and the spring 15. The apertures are of sufficient extent to permit of the inward movement of the parts in traveling from full release to the retarded release position.

The above construction is preferably mounted in a centrally arranged chamber 11 of the triple valve piston and stem, the chamber being closed by a suitable screw cap at its outer end and being of sufficient depth to permit the desired free relative movement of the parts.

The stem 14 is rigidly connected to the main slide valve by means of a pin 18, which is adapted to be inserted in place through apertures 20 and 21, located respectively in the wall of the chamber 11 and in the thimble 12, by adjusting the parts so that the apertures are in alinement.

The pin 18 projects out far enough to engage in an aperture formed in a forward extension of the main valve 5 so as to form a rigid connection thereto.

The opposition to movement from full release position to the inner retarded release position is brought about by providing an extended pin 22 adapted to have free endwise movement through the triple valve piston stem 10, and one end of the pin is adapted to extend into the chamber 11 and engage the thimble 12 while the opposite end projects out of the piston stem so as to engage a fixed abutment 23 which may be secured in any suitable manner to the triple valve casing or bushing.

The pin 22 is of such length as to fill the space between the abutment 23 and the thimble 12 when the parts are in full release position so that further inner movement of the parts to the retarded release position causes the pin 22 to act as a stop for the thimble 12 and consequently the spring 15 is compressed.

A service application of the brakes may be made in the usual manner by reducing the brake pipe pressure, whereupon the higher auxiliary reservoir pressure causes the triple piston and the auxiliary slide valve to move forward, closing the feed groove 40 around the triple piston, uncovering service port 36, and then as the lost motion is taken up between the piston and main slide valve, both move together to service position, in which the service port 36 registers with brake cylinder port 8 and air flows from the auxiliary reservoir to the brake cylinder. In taking up this lost motion it will be noted that the yielding resistance device moves freely in the chamber 11, and thus the movement of the piston and auxiliary valve is not impeded.

When the brake pipe pressure is increased in the usual manner for releasing the brakes the triple piston moves to full release position in which the pin 22 engages the fixed abutment 23 as shown in Fig. 1. On the cars at the head end of the train the increase in brake pipe pressure is much greater than toward the rear of the train, so that at the head end the triple pistons are moved further inwardly against the resistance of spring 15 to the retarded release position as shown in Fig. 2, in which the passage to the exhaust is either closed or is restricted by providing a restricted portion 37 of the exhaust cavity 7, as shown in Fig. 6, which registers with the exhaust port 9 in the retarded release position.

On the cars at the rear end of the train the triple pistons move only to full release position, as the increase in brake pipe pressure is not sufficient to move the parts to the retarded release position, thus a more uniform release of the brakes throughout the train is obtained.

As the pressures equalize on the triple pistons at the head end of the train, the springs 15 return the parts to full release position.

As the spring 15 acts directly on both the main slide valve and the piston, it will be seen that the parts are returned to full release position with the normal relative position of the parts retained in full release position.

Another form of my improvements is shown in Figs. 5, 6, 7, and 8 of the drawings in which the operating pin 22 and fixed abutment 23 are dispensed with and a transversely arranged pin 28 is fixed in the thimble 24 similar to the thimble 12 in the before described construction. The ends of the pin project out into recesses 29 cut in the triple valve bushing 30, the recesses being of such length that the pin 28 engages the rear end walls of the recesses when the triple valve parts are in full release position. In this construction the valve operating pin 26 is secured to the stem 25 by a pin 27 and extends upwardly so that the pin may engage the end walls of recesses cut in the socket section 24 and thereby hold the resistance spring 15 under the desired initial compression, said recesses being of sufficient depth to permit the desired relative movement of the pin 26. It will now be seen that the yielding resistance device is adapted to move with the main valve and permit of the free relative movement of the triple piston and the auxiliary valve as in the first described construction. In the inward movement of the triple valve piston from the full release position to retarded release position on the forward cars, the pin 28 engages the end walls of the recesses 29, so that the spring 15 is compressed and thereby offers a resistance to the movement of the parts and as equalization of train pipe and auxiliary reservoir pressures takes place the spring returns the main valve and triple piston to full release position.

It will now be seen that with present invention a retarded release triple valve device is provided wherein the main slide valve is adapted to move from full release to retarded release position to restrict the flow of air from the brake cylinder through the exhaust port and in which an auxiliary valve having a movement relative to the main valve controls the brake cylinder service port in service applications of the brakes, the yielding resistance device being carried by the moving parts of the triple valve device.

Having now described my invention, what I claim as new and desire to secure by Letters Patent, is:—

1. In a triple valve device, a valve mechanism comprising a piston subject to variations in brake pipe pressure, a main slide valve operated thereby for controlling the exhaust from the brake cylinder, said valve mechanism having a normal full release position and a retarded release position, an auxiliary valve operated by said piston for controlling the brake cylinder service port, and yielding resistance means carried by said valve mechanism for opposing the movement of said main slide valve from the full release position to the retarded release position.

2. In a triple valve device, a main slide valve for controlling the exhaust from the brake cylinder, an auxiliary valve having a movement relative to the exhaust controlling valve for controlling the brake cylinder service port, a piston subject to variations in brake pipe pressure for operating said valves and a spring carried by the moving parts of the triple valve device for opposing the movement of the piston and exhaust valve from full release position to a position in which the exhaust opening from the brake cylinder is restricted.

3. A triple valve device consisting of a casing containing a valve mechanism comprising a main slide valve for controlling the exhaust from the brake cylinder, an auxiliary valve having a movement relative to said main valve for controlling the supply of air from the auxiliary reservoir to the brake cylinder in service applications of the brakes, a piston subject to variations in brake pipe pressure for operating said valves and a yielding resistance means carried by said valve mechanism for returning said main valve and piston from a position in which the flow of air from the brake cylinder through the exhaust port is restricted to the normal full release position.

4. In a triple valve device a valve for controlling the brake cylinder exhaust having a full release position and a retarded release position, an auxiliary valve having a movement relative to the exhaust controlling valve, a piston subject to variations in brake pipe pressure for operating said valve and having a fixed relation to said auxiliary valve, and a spring carried by said piston for returning the exhaust valve and piston from the retarded release position to the full release position.

5. In a fluid pressure brake, the combination with a brake pipe and brake cylinder, of a valve and piston operated by variations in brake pipe pressure for controlling the brake cylinder exhaust, an auxiliary valve operated by and having the same traverse as said piston and having a movement relative to said exhaust controlling valve for controlling the brake cylinder service supply port, and a yielding resistance means carried by said piston for opposing the movement of the exhaust valve and piston from normal full release position to a position in which the flow of air from the brake cylinder through the exhaust port is restricted.

6. In a triple valve device, a valve for controlling the brake cylinder exhaust, an auxiliary valve having a movement relative to the exhaust controlling valve for controlling the brake cylinder service supply port, a piston subject to variations in brake pipe pressure for operating said valves, and a yielding resistance means mounted to operate with said exhaust valve and carried by the piston for opposing the movement of said exhaust valve from full release position to a position in which the exhaust opening from the brake cylinder is restricted.

7. A triple valve device comprising a casing containing a main valve for controlling the brake cylinder exhaust and having a full release position and a retarded release position, a piston subject to brake pipe pressure for actuating said valve, and a yielding resistance means carried by the moving parts of the triple valve device and acting directly on said valve for returning same from the retarded release position to the full release position.

8. In a triple valve device a main valve for controlling the brake cylinder exhaust and having a full release position and a retarded release position, an auxiliary valve for controlling the supply of air from the auxiliary reservoir to the brake cylinder in service application of the brakes, a piston subject to brake pipe pressure for operating said valves, and a spring device carried by said piston for returning the exhaust controlling valve and the piston from retarded release position to full release position and adapted to act directly on said main valve and piston.

9. In a triple valve device a valve for controlling the brake cylinder exhaust and having a normal full release position and a retarded release position in which the flow of air from the brake cylinder through the exhaust port is restricted, an auxiliary valve having a movement relative to the exhaust controlling valve for controlling the brake cylinder service supply port, a piston subject to brake pipe pressure for operating said valves, and a yielding resistance means carried by said piston and moving with said exhaust valve for opposing the movement of said exhaust valve from full release position to retarded release position.

10. In a triple valve device a valve for controlling the brake cylinder exhaust and having a normal full release position and a retarded release position in which the flow of air from the brake cylinder through the exhaust port is restricted, an auxiliary valve having a movement relative to the exhaust controlling valve for controlling the brake cylinder service supply port, a piston subject to brake pipe pressure for operating said valves, and a yielding resistance means carried by and having a free movement relative to said piston and tending to move said exhaust valve and piston from the retarded release position to the full release position.

11. In a triple valve device, a valve mechanism comprising a main valve for controlling the brake cylinder exhaust and having a normal full release position and a retarded release position, a piston operated by variations in brake pipe pressure for controlling said valve, a spring carried by said valve mechanism, and a stop for engaging one end of the spring in full release position, the other end of the spring being adapted to act on the valve and piston arranged in parallel and thereby oppose the movement of said valve and piston from the full release position to the retarded release position.

12. In a triple valve device, a valve for controlling the brake cylinder exhaust having a full release position and a retarded release position, a piston operated by variations in brake pipe pressure for controlling said valve, a yielding resistance device carried by said valve for opposing the movement of same from full release position to the retarded release position comprising a spring, abutments for confining said spring under initial compression and having a limited relative movement, and a fixed stop for engaging one abutment in full release position, the other abutment being adapted to engage the piston.

13. In a triple valve device, a main valve for controlling the brake cylinder exhaust having a full release and a retarded release position, an auxiliary valve having a movement relative to the main valve for controlling the brake cylinder service port, a piston operated by variations in brake pipe pressure for controlling said valves, and a yielding resistance device carried by and having movement with said main valve for opposing the movement of said valve from full release position to retarded release position, said yielding resistance device comprising a spring, telescoping sections between which the spring is mounted, a stop for limiting the expansive movement of the spring, and a fixed stop for engaging one section in full release position.

In testimony whereof I have hereunto set my hand.

WALTER V. TURNER.

Witnesses:
  Wm. M. Cady,
  A. M. Clements.

Copies of this patent may be obtained for five cents each, by addressing the "Commissioner of Patents Washington, D. C."